United States Patent [19]

Kelly

[11] 4,145,709

[45] Mar. 20, 1979

[54] AUTOMATIC LOCALIZED MICRO-CONTRAST CONTROL FOR PHOTOGRAPHIC PRINTING SYSTEMS

[76] Inventor: Michael J. Kelly, 6307 MacArthur Blvd., Brookmont, Md. 20016

[21] Appl. No.: 834,197

[22] Filed: Sep. 19, 1977

[51] Int. Cl.$^2$ ............................................. H04N 5/84
[52] U.S. Cl. ......................................................... 358/6
[58] Field of Search ................... 358/6, 75, 76, 78, 80, 358/130, 302, 160

[56] References Cited

U.S. PATENT DOCUMENTS

| | | | |
|---|---|---|---|
| 3,697,174 | 10/1972 | McCune | 358/76 |
| 3,934,081 | 1/1976 | Schumacher | 358/75 |
| 4,058,828 | 11/1977 | Ladd | 358/80 |

Primary Examiner—Richard Murray
Attorney, Agent, or Firm—William G. Gapcynski; Werten F. W. Bellamy; Sherman D. Winters

[57] ABSTRACT

A method and apparatus for adjusting an exposure of a negative image having incremental areas to enhance the contrast of a print resulting from the negative image. The incremental areas of the negative image to be printed are initially scanned providing corresponding sensor signals which are directed to a processing circuit which separates the sensor signals into amplitude ranges according to the amplitude of the sensor signal and according to the amplitude range of the sensor signal as compared to an average sensor signal. Each range is inputted to a signal generator which provides a corresponding signal having an adjusted wavelength determining contrast and an adjusted amplitude determining intensity of exposure, each dependant upon the corresponding amplitude range and amplitude of the sensor signals, respectively. If the sensor signals are at an amplitude which is less than the average sensor signal, the corresponding signal has a proportionally increased intensity. If the sensor signals are at an amplitude which is greater than the average sensor signal the corresponding signal has a proportionally decreased intensity. The corresponding signals are directed to a color gun of a CRT which is used to provide the light necessary to illuminate the corresponding incremental area of the negative image for printing on a raw photographic stock. The wavelength of the corresponding signal generator is pre-set dependant upon the amplitude range to result in a CRT output which provides color light corresponding to a desired level of contrast created by the photographic raw stock.

9 Claims, 3 Drawing Figures

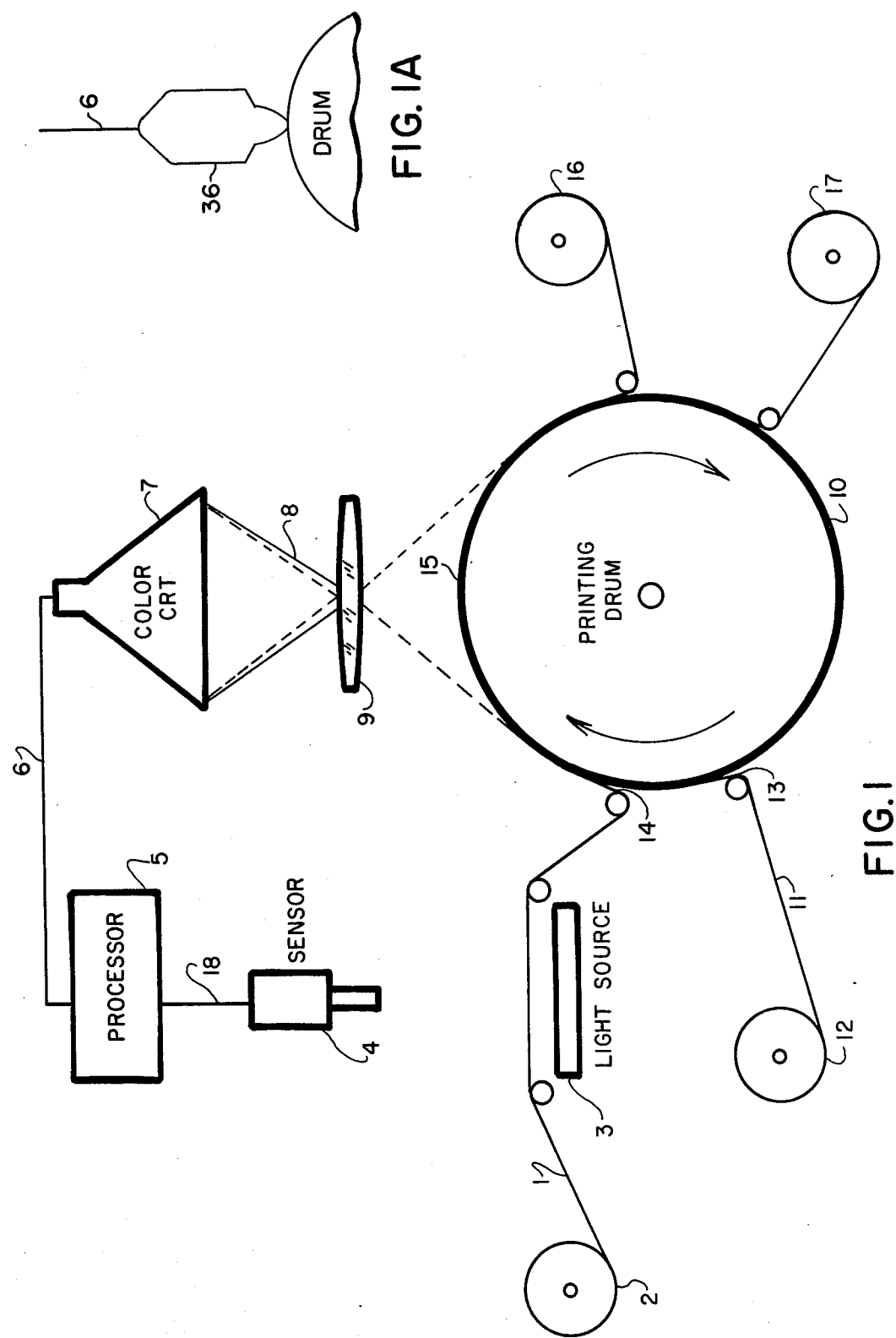

AUTOMATIC LOCALIZED MICRO-CONTRAST CONTROL FOR PHOTOGRAPHIC PRINTING SYSTEMS

The invention described herein may be manufactured and used by or for the Government for governmental purposes without payment of any royalty thereon.

BACKGROUND OF THE INVENTION

1. Field of the Invention

The invention generally relates to the contrast controlling during the printing of photographic images and, more specifically, relates to the automatic localized micro-contrast control of incremental areas of negative images according to the amplitude of the incremental area of the negative image and according to the amplitude range of the incremental area of the negative image as compared to the average amplitude range of the negative image.

Background of the Invention

The invention is intended to make full advantage of commercially available photosensitive products such as Kodak Polycontrast and DuPont Varigam. These photographic papers consist of emulsions which are responsive in varying degrees of contrast to the color and intensity of the light used to expose them thereby allowing for a wide range of contrast in a printed photograph depending on the intensity and light color applied to the method of exposure. By judicious use of exposure lighting in conjunction with these photosensitive papers, it can be seen that prints of widely disparate quality can be made from the same negative. It can also be seen that the optimum advantage can be had if the color and intensity of exposure light is varied selectively with a single frame, augmenting areas of poor contrast on the negative and supressing areas of high contrast when desired. This has been accomplished in the past by successive partial exposures using different colors and intensities and by variable contrast filters.

More advanced methods have been suggested using a sensor and a CRT, but these methods have been unsuccessful for various reasons. The described invention overcomes the weaknesses found in the prior art.

Craig in his U.S. Pat. Nos. 2,880,662 and 2,927,520 describes the prior art and the objectives, benefits and needs for a photographic system capable of achieving the invention described herein. The key to achieving these goals successfully and avoiding gross subject failure lies in the sensing means of the invention. All other physical features of the invention will be dictated by the requirements of an optimum sensor means.

In Craig U.S. Pat. No. (2,880,662), a sensor logic is built on the premise that low frequency voltage changes as sensed by the sensor means and the magnitude of these changes are the key to proper exposure determination. The patent is limited to low frequency because it shows, firstly, that the light from the CRT (exposing means) is sensed from behind the transparency and photosensitive sandwich which has a diffusing and integrating effect upon the incident light energy that is transmitted through to the sensing means, and, secondly, that the exposing means is by design of a low frequency defocused resolution type in order to avoid image transfer interference from the exposing means during exposure.

In Craig's later patent on the same subject U.S. Pat. No. (2,927,520) low frequency voltage change is abandoned in favor of intensity level discernment for color switching by the sensing means.

Other prior art also shows illuminating the negative raw stock sandwich with a color CRT and collecting light which penetrates the sandwich with a photo cell. By various circuits, including photomultipliers and amplifiers, a signal is generated and fed back to the CRT generating a new light pattern for the exposure.

The invention herein eliminates the concept of sensing light which passes through the essentially light diffused raw stock. The image herein is taken directly from the backlighted negative and processed so that it exposes the negative at another place where it is in contact with the raw stock. The sensing scanner must be able to discern the image on the negative to a high resolution. This high resolution is lost when sensing the image through the light diffusive properties of the raw stock.

SUMMARY OF THE INVENTION

The incremental areas of the negative image to be printed are prescanned by a sensing means with a high resolution capability resulting in a plurality of analog sensor signals corresponding to the intensity of the image at each incremental area. These analog sensor signals are converted to digital notation by an analog to digital converter. The output of the analog to digital converter is simultaneously connected to a digital averager and a first storage means. The digital averager averages the digital sensor signals and the resulting average sensor signal is provided to a second storage means. A digital comparator receives the output of the first and second storage means and compares the digital sensor signals to the average sensor signal and separates the sensor signal according to their amplitude. The separated signals are fed to a signal generator which provides a corresponding signal having frequency and intensity dependant upon the corresponding amplitude range. The corresponding signals are processed through digital to analog converters resulting in analog signals which are connected to a color gun of a CRT. The light output from the CRT is used as a defocused, diffused light image to expose the negative image producing a contrast controlled print on the photographic raw stock.

It is an object of this invention to provide an exposure system which has automatic localized microcontrast control. It is another object of this invention to provide an apparatus which produces optimum exposure light, both color and intensity, by prescanning the negative to be processed and processing the signals resulting from the prescanning to generate the exposure light at a different time and place. It is the further object of this system to provide a photographic printing system which prescans the backlighted negative image to be printed and adjusts the color and intensity of the exposing light according to intensity of the negative image. It is another object of this invention to provide a photographic printing system which produces a print which has adjusted contrast according to the amplitude of the incremental area of the negative image and according to the incremental area of the negative image as compared to the average incremental area negative image.

BRIEF DESCRIPTION OF THE DRAWINGS

These and other objects will become apparent to those skilled in the art by referring to the drawings in which:

FIG. 1 is a diagram of the preferred embodiment of the invention as applied to a continuous printing system;

FIG. 1A illustrates the use of fiber optics in the invention.

DESCRIPTION OF THE PREFERRED EMBODIMENT

Figure 3:
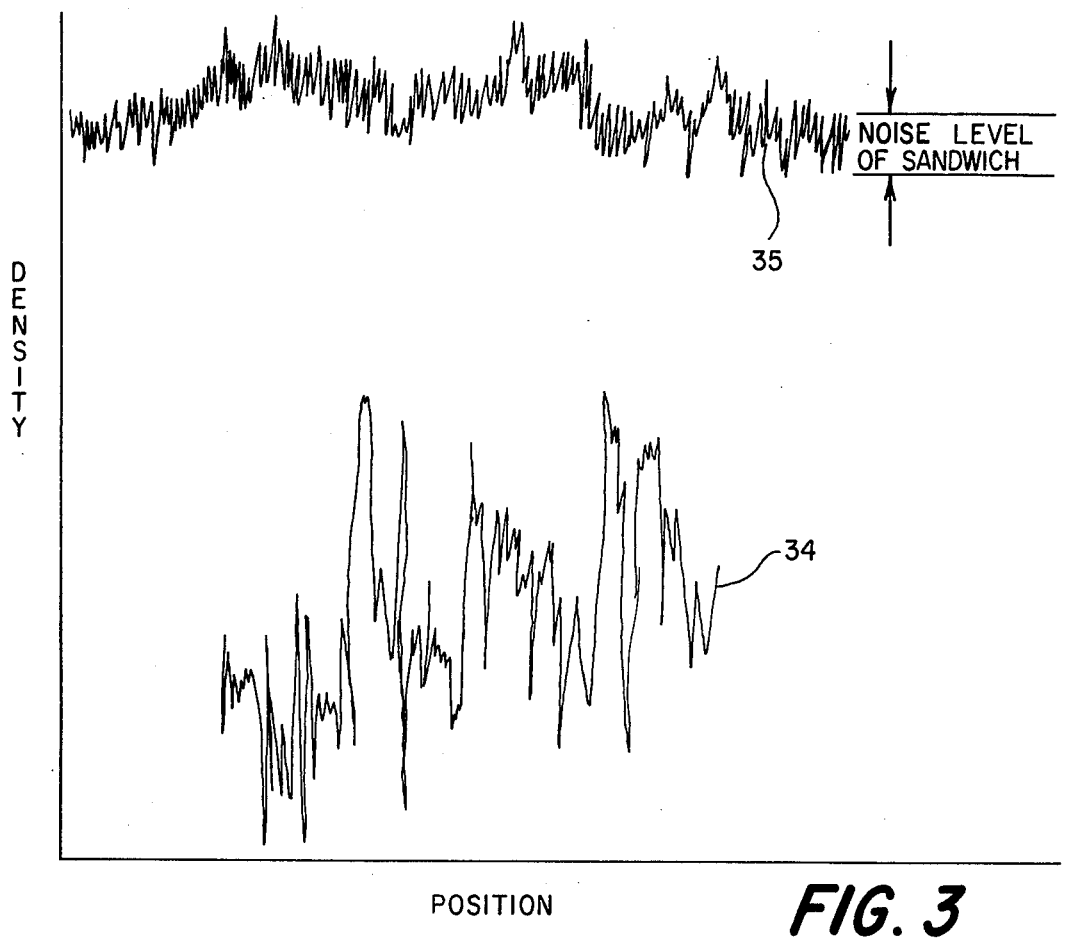
FIG. 3 is a graph comparing the sensing density used in the prior art to the sensing density of the instant invention.

Referring to FIG. 1, the preferred embodiment of the invention is shown as it would be applied to a continuous printing system. The negative 1 which is to be printed is supplied by the black and white negative supply spool 2 and is transferred over the continuous intensity light source 3. At that point sensor 4 scans the incremental areas of the image which is received from the light source 3 through the negative 1. The resulting scanned signal is fed to a processor 5 which adjusts the signal according to the invention. The sensor 4 can be any black and white sensing means such as a vidicon which is used to resolve image changes in the size range of 10 to 50 cycles per millimeter. The processing circuit 5, shown in FIG. 2 in detail, will be discussed specifically below. The resulting processed signal 6 is then applied to the color gun of a cathode ray tube 7. This results in a diffused, defocused image 8 which is focused by lens 9 and applied to printing sandwich as it is located on the printing drum 10.

The photographic raw stock 11 which is to be printed is provided by printing stock supply spool 12. It is fed onto printing drum 10 first at point 13. At point 14 the negative 1 is fed onto printing drum 10 on top of the photographic raw stock 11 creating a printing sandwich. As the drum then turns the printing sandwich appears at 15 where it is exposed by the light output of the CRT 7 as focused by the lens 9. At this point the image 8 is applied to the negative and the result is that the printing photographic raw stock 11 is printed with an image which has an automatic localized micro-contrast controlled intensity. As the printing drum then continues to turn, the negative 1 is fed onto take up spool 16 and the printed stock is fed onto take up spool 17.

As an alternative, in FIG. 1A, the focusing of image 8 by lens 9 can be replaced by fiber optics and the printing sandwich at point 15 can be in direct contact with the fiber optics. For example, CRT 7 can be a color fiber optic faceplate CRT 36 and the printing sandwich at point 15 can be in direct contact with the faceplate of the CRT.

Figure 2:
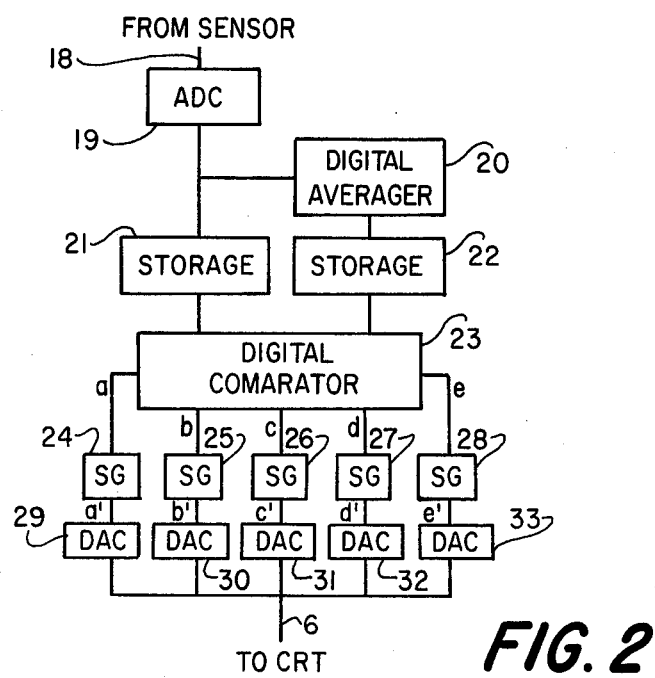
FIG. 2 is a block diagram of the preferred embodiment of the processing circuit used in the invention.

Referring now to FIG. 2 the signal resulting from the sensor output 18 is applied to the automatic digital converter 19 and converted into a digital sensor signal. This resulting digital signal is simultaneously applied to the digital averager 20 and the storage 21. The digital averager 20 averages the signals and provides an average digital signal to storage 22. Storages 21 and 22 are selected to accept the digital signals and delay the signals an appropriate amount of time so that the output of the cathode ray tube (CRT) is synchronized with the printing sandwich at 15. The outputs of the storages 21 and 22 are processed by digital comparator 23 which compares the digital sensor signal to the average digital sensor signal and separates the signals according to their amplitude.

The number of grouped, separated signals is dependent upon the number levels of contrast selected. Each level of contrast would have a corresponding wavelength (color) which would be used to expose the photographic raw stock to achieve the level of contrast. The grouped, separated signals are associated with a certain contrast level.

The photographic raw stock 11 is a commercially available photosensitive product such as Kodak Polycontrast and DuPont Varigam. These papers have emulsions which are responsive to varying degrees of contrast to the color and intensity of the light used to expose them. In one embodiment, the amplitude ranges which are below the average digital sensor signal are connected to signal generators which provide corresponding signals resulting in the CRT output having the color corresponding to high contrast for the photosensitive raw stock. Those amplitude ranges which are above the average digital sensor signal are connected to signal generators which provide corresponding signals resulting in the CRT output having the color corresponding low contrast for the photosensitive raw stock. The level of contrast can be adjusted according to the amplitude range simply by adjusting the signal generator.

Therefore, the separate amplitude ranges are connected to signal generators 24, 25, 26, 27 and 28 to produce a corresponding signal which is fed to digital to analog converters 29, 30, 31, 32 and 33 for conversion to analog and connection the CRT 7.

EXAMPLE OF OPERATION

Consider the following oversimplified example. Negative 1 is a backlighted by light source 3 and scanned by vidicon 4. The scanning determines that the negative has ten incremental areas with amplitudes of 10, 2, 3, 10, 5, 6, 17, 8, 9, been 10. The vidicon output 18 is converted to digital notation by ADC 19. This notation is stored in storage 21. The digital averager 20 simultaneously averages the amplitudes resulting in the average of 8 being stored in the storage 22.

Assume that the photographic stock 11 is of a type which is responsive to varying wavelengths of red light and assume that the five levels of contrast are desired. Assume further that digital comparator 23 has beenn set up to group the signals into five ranges: range a for signals 0–30% of the average signal; range b for signals 31–60% of the average; range c for signals 61–90% of the average; range d for signals 91–120% of the average; and range e for signals above 120% of the average. Also assume that the ranges have been related to contrast and intensity by inputting range a into signal generator 24 which is preset to provide corresponding signals a' having wavelength corresponding to lowest level of contrast and having an intensity 30% greater than the incoming signals. Similarly, range b is input into signal generator 25 which is preset to provide corresponding signals b' having wavelength corresponding to the next highest level of contrast and having an intensity 20% greater than the incoming signals. Similarly, range c is input into signal generator 26 which is preset to provide corresponding signals c' having wavelength corresponding to the middle level of contrast and having an intensity 10% greater than the incoming signals. Range d, the desired range, is input into signal generator 27 which is preset to provide corresponding signals d' having wavelength corresponding to the next lowest level of contrast, the desired level, and having an intensity equal to the incoming signals, the desired intensity level. Finally, range e, is input into signal generator 28 which is preset to provide corresponding signals e' having wavelength corresponding to the lowest level of contrast and having an intensity 10% less than the incoming signal.

The digital comparator would compare each signal stored in storage 21 to the average signal stored in storage 22 and place it in the proper range. Therefore, range a would have the second incremental area (2), range b would have the third incremental area (3), range c would have the fifth and sixth incremental areas (5 and 6), range d would have the eight and ninth incremental areas (8 and 9), and range e would have the first, fourth, seventh and tenth incremental areas (10, 10, 17 and 10).

The resulting image 8 of the CRT 7 would have incremental areas with the following respective amplitudes (the parenthetical letter refers to the range of the signal and, therefore, the contrast of the signal because range a has the highest contrast, range b the next to highest level of contrast, range c the middle level of contrast, range d the next to lowest level of contrast, and range e the lowest level of contrast): 9(e), 2.6(a), 3.6(b), 9(e), 5.5(c), 6.6(c), 15.3(e), 8(d), 9(d), 9(e).

One advantage of the disclosed invention over the prior art is its use of a sensing approach which resolves fine resolution. To graphically illustrate this difference over the prior art, FIG. 3 is a simulation of a graph made from the use of a micro-densitometer of the sensing concepts of the prior art and the disclosed invention. Signal 34 was made from typical aerial imagery. The micro-densitometer was focussed and had a resolution response limit on the order of 25 cycles/mm. Signal 35 is a continuation of the aerial image trace of signal 34 but with the introduction of a photo paper raw stock to simulate the effects of sensing through a printing sandwich, as taught by the prior art. Signal 35 compared to signal 34 shows a complete integration of the high frequency signal, making it virtually impossible to determine the true quality of the imagery being scanned. No effort was made to defocus the micro-densitometer during the printing sandwich trace of Signal 35 because this would only further tend to integrate and degrade the frequency response which has already been lost at this stage of simulation.

I claim:

1. A method for exposing with automatic localized micro-contrast control a negative image having incremental areas on a photographic raw stock comprising the steps of:
   a. prescanning the incremental areas of the negative image with a high resolution sensor means resulting in a plurality of analog sensor signals corresponding to the intensity of the image at each incremental area;
   b. processing the analog sensor signals by separating the signals into amplitude ranges;
   c. illuminating a CRT having a color gun by directing the signals from the amplitude ranges to signal generators which are connected to the color gun of the CRT thereby providing a corresponding light output, said signal generators providing signals to said CRT which create light color responsive to the contrast desired from the photographic raw stock; and
   d. applying the light output through the corresponding incremental area of the negative image to the photographic raw stock thereby exposing the raw stock to an automatic localized micro-contrast controlled negative image.

2. The method as described in claim 1 wherein the step of prescanning includes backlighting the image with a constant intensity source and the sensor means is comprised of a vidicon.

3. The method as described in claim 1 further comprising the step of adjusting the intensity of the light output of the CRT for a given incremental area by comparing the corresponding sensor signals for a given amplitude range to an average of the sensor signals and proportionally increasing the sensor signals if it is less than the average sensor signal and proportionally decreasing the sensor signal if it is greater than the average sensor signal.

4. An apparatus for exposing with automatic localized micro-contrast control a negative image having incremental areas on a photographic raw stock comprising:
   a. sensor means, having an output, for prescanning the incremental area of the negative image and providing, at said sensor means output, a plurality of analog sensor signals corresponding to the intensity of each incremental area;
   b. processor means having an input connected to the output of the sensor means and having outputs, said processor means for separating the signals into amplitude ranges; and
   c. CRT means having a color gun and a light output for illuminating the negative image on the photographic raw stock by applying the signals from the outputs of the processor means to the color gun of said CRT and directing said corresponding light output through the negative image to the photographic raw stock.

5. The apparatus as described in claim 4 further comprising a lens means for focusing said corresponding light output through the negative image.

6. The apparatus as described in claim 4 wherein said CRT means comprises a color fiber optic faceplate CRT.

7. The apparatus as described in claim 4 whereinsaid sensor means is a vidicon.

8. The apparatus as described in claim 4 wherein said processor means comprises:
   a. analog to digital converter means having an input connected to the output of the sensor means and an output for converting the analog sensor signals into corresponding digital sensor signals;
   b. digital averager means having input connected to the output of the analog to digital converter means and output for averaging the digital sensor signals to an average digital sensor signal;
   c. first storage means having an input connected to the output of the analog to digital converter means for storing the digital sensor signal;
   d. second storage means having an input connected to the output of the digital averager means and an output for storing the average digital sensor signal;
   e. digital comparator means having inputs connected to said first and second storage means and outputs for comparing the digital sensor signals to the average digital sensor signal and providing at each output the digital sensor signals within a given amplitude range;
   f. a plurality of signal generator means, each said signal generator means having an input separately connected to one digital comparator means output and having an output, said signal generator means providing a corresponding signal having a frequency and amplitude dependent upon the corresponding amplitude range; and g. a plurality of digital to analog converter means having inputs separately connected to each said signal generator means output and an output connected to said color gun for converting the corresponding signals into analog signals.

9. A method for exposing with automatic localized micro-contrast control a negative image having incremental areas on a photographic raw stock comprising the steps of:

a. prescanning the incremental areas of the negative image with a high resolution sensor means resulting in a plurality of analog sensor signals corresponding to the intensity of the image at each incremental area;

b. processing the analog sensor signals by separating the signals into amplitude ranges;

c. converting the signals from the amplitude ranges into a corresponding light output, which contains light color responsive to the contrast desired from the photographic raw stock; and d. applying the light output through the corresponding incremental area of the negative image to the photographic raw stock thereby exposing the raw stock to an automatic localized micro-contrast controlled negative image.

* * * * *